US012807738B2

(12) United States Patent
Andersen et al.

(10) Patent No.: US 12,807,738 B2
(45) Date of Patent: Nov. 24, 2026

(54) INTEGRATED PROCESSES FOR PECTIN ACTIVATION AND MILD EXTRACTION

(71) Applicant: CP Kelco ApS, Lille Skensved (DK)

(72) Inventors: Bastian Andersen, Valby (DK); José Júnior Butzge, Limeira (BR); Jan Aae Staunstrup, Vanloese (DK)

(73) Assignee: CP Kelco ApS, Lille Skensved (DK)

( * ) Notice: Subject to any disclaimer, the term of this patent is extended or adjusted under 35 U.S.C. 154(b) by 851 days.

(21) Appl. No.: 18/173,209

(22) Filed: Feb. 23, 2023

(65) Prior Publication Data

US 2023/0272124 A1 Aug. 31, 2023

Related U.S. Application Data

(60) Provisional application No. 63/353,051, filed on Jun. 17, 2022, provisional application No. 63/313,785, filed on Feb. 25, 2022.

(51) Int. Cl.
*C08B 37/00* (2006.01)

(52) U.S. Cl.
CPC ................................ *C08B 37/0048* (2013.01)

(58) Field of Classification Search
CPC ................................................. C08B 37/0048
See application file for complete search history.

(56) References Cited

U.S. PATENT DOCUMENTS

| | | | |
|---|---|---|---|
| 2,273,521 | A | 2/1942 | Hirsch |
| 5,567,462 | A | 10/1996 | Ehrlich |
| 10,287,366 | B2 | 5/2019 | Staunstrup et al. |
| 2020/0046008 | A1 | 2/2020 | Hansen et al. |

FOREIGN PATENT DOCUMENTS

| | | |
|---|---|---|
| WO | WO 2015/091629 | 6/2015 |
| WO | WO 2021/228963 | 11/2021 |

OTHER PUBLICATIONS

Result of Consultation in EP23707345.7, dated Sep. 22, 2025, 5 pages.
International Search Report and the Written Opinion of the International Searching Authority in PCT/EP2023/054606 dated May 16, 2023, 11 pages.

*Primary Examiner* — Layla D Berry
(74) *Attorney, Agent, or Firm* — Merchant & Gould P.C.

(57) ABSTRACT

Methods for pectin activation and pectin extraction, with high quality and efficiency, from plant-based materials that contain pectin are disclosed. A pectin-containing biomass material is first treated in hot, acidic aqueous alcohol with the objective of converting water-insoluble pectin into water-soluble pectin; the material after treatment is often referred to as an activated pectin-containing biomass material. Then, the activated pectin-containing biomass material is contacted with an aqueous media under controlled pH conditions to extract a water-soluble pectin component in high yield and pectin quality.

17 Claims, 3 Drawing Sheets

INTEGRATED PROCESSES FOR PECTIN ACTIVATION AND MILD EXTRACTION

REFERENCE TO RELATED APPLICATIONS

This application claims the benefit of U.S. Provisional Patent Application No. 63/353,051, filed on Jun. 17, 2022, and U.S. Provisional Patent Application No. 63/313,785, filed on Feb. 25, 2022, the disclosures of which are incorporated herein by reference in their entirety.

FIELD OF THE INVENTION

The present invention is directed generally to a method of pectin activation and pectin extraction, and more particularly, to a method that first converts water-insoluble protopectin into water-soluble pectin under high temperature acidic-alcohol conditions, followed by an aqueous extraction of the water-soluble pectin at a pH greater than that utilized in the activation step.

BACKGROUND OF THE INVENTION

Pectin is a complex polysaccharide present in the cell wall and middle lamella of plant tissues. Citrus fruit rind, also referred to as citrus peel, is the most available and widely used raw material for industrial pectin production, although apple pomace and sugar beet pulp also are employed. Chemically, the backbone of pectin consists of a linear chain formed by a (1→4) linked galacturonic acids monomers. The galacturonic acid units may be present as either free carboxylic acid groups or methyl esterified, where the fraction methylated is denoted as the degree of esterification (DE), usually presented as a percentage. Besides the backbone, the pectin molecule contains different neutral sugar groups, usually denoted as hairy regions.

Pectin is widely used in food, chemical and pharmaceutical industries. Commercial pectins are conventionally classified in two categories depending on the DE, in which high methoxy pectins (HM) have a DE higher than 50% while low methoxy pectins have a DE lower than 50%. The physical and chemical properties of pectin are associated with the presence of methyl ester groups and the DE determines the functionality and, consequently, its industrial application. In addition, another important pectin quality parameter is known as intrinsic viscosity (IV). The units of IV are volume per weight, typically dL/g, and high values indicates large pectin backbones. Pectins with high IV values are desirable in a great number of pectin products, indicating its innate pectin form and having superior functionality and application performance.

Pectin IV and DE can vary for natural reasons (e.g., raw material, season, maturity stage, post-harvest residence time), however, these two parameters are highly affected by the pectin activation and extraction conditions. From an economic point of view, high pectin extraction yield is desirable during the pectin production process. However, to obtain high pectin extraction yield, severe process conditions often are required (e.g., low pH and high temperature), which can lead to pectin molecule degradation and have a negative effect on quality parameters (e.g., IV and DE), and consequently, limit the use of pectin in certain applications. If pectin is exposed to alkaline conditions, or even very mild acidic conditions (e.g., pH 5-7), another route of backbone degradation may occur, called beta-elimination. Relative to degradation via acid, the beta-elimination is much faster and is generally avoided.

Therefore, methods for activating and extracting pectin that can combine high pectin quality with high pectin yield would be beneficial. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Processes for activating and extracting pectin from plant-based raw materials are disclosed and described herein. One such process can comprise (a) providing an aqueous alcohol mixture containing water, at least 35 wt. % alcohol, and a starting pectin-containing biomass material comprising an insoluble fiber component and an insoluble protopectin component, (b) contacting an acid with the aqueous alcohol mixture at a temperature of at least 40° C. and a pH in a range from 0.5 to 2.5 to form an activated mixture containing a liquid component and an activated pectin-containing biomass composition comprising the insoluble fiber component and a water-soluble pectin component, (c) removing at least a portion of the liquid component from the activated mixture to form a solid fraction containing the activated pectin-containing biomass composition, and (d) contacting the solid fraction with water to form an aqueous mixture and adjusting a pH of the aqueous mixture to within a range from 3.5 to 6, thereby forming a liquid fraction containing the water-soluble pectin component. Mechanical energy is applied to the aqueous alcohol mixture of step (a), or to the activated mixture of step (b), or both.

Another process encompassed herein can comprise (i) providing an aqueous alcohol mixture containing water, at least 35 wt. % alcohol, and a starting pectin-containing biomass material comprising an insoluble fiber component and an insoluble protopectin component, (ii) contacting an acid with the aqueous alcohol mixture at a temperature of at least 40° C. and a pH in a range from 0.5 to 2.5 to form an activated mixture containing a liquid component and an activated pectin-containing biomass composition comprising the insoluble fiber component and a water-soluble pectin component, (iii) adjusting the pH of the activated mixture to at least 2.8, (iv) removing at least a portion of the liquid component from the activated mixture to form a solid fraction containing the activated pectin-containing biomass composition, (v) drying the solid fraction, and (vi) contacting the solid fraction with water to form an aqueous mixture and adjusting a pH of the aqueous mixture to within a range from 3.5 to 6, thereby forming a liquid fraction containing the water-soluble pectin component. Mechanical energy is applied to the aqueous alcohol mixture of step (i), or to the activated mixture of step (ii), or both.

Yet another process encompassed herein can comprise (A) providing an aqueous alcohol mixture containing water, at least 35 wt. % alcohol, and a starting pectin-containing biomass material comprising an insoluble fiber component and an insoluble protopectin component, (B) contacting an acid with the aqueous alcohol mixture at a temperature of at least 40° C. and a pH in a range from 0.5 to 2.5 to form an activated mixture containing a liquid component and an activated pectin-containing biomass composition comprising the insoluble fiber component and a water-soluble pectin component, (C) adjusting the pH of the activated mixture to within a range from 3.5 to 6, (D) removing at least a portion of the liquid component from the activated mixture to form a solid fraction containing the activated pectin-containing biomass composition, and (E) contacting the solid fraction with water to form an aqueous mixture and adjusting a pH of the aqueous mixture to within a range from 3.5 to 6, thereby forming a liquid fraction containing the water-soluble pectin component. Mechanical energy is applied to the aqueous alcohol mixture of step (A), or to the activated mixture of step (B), or both.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

DEFINITIONS

Figure 1:
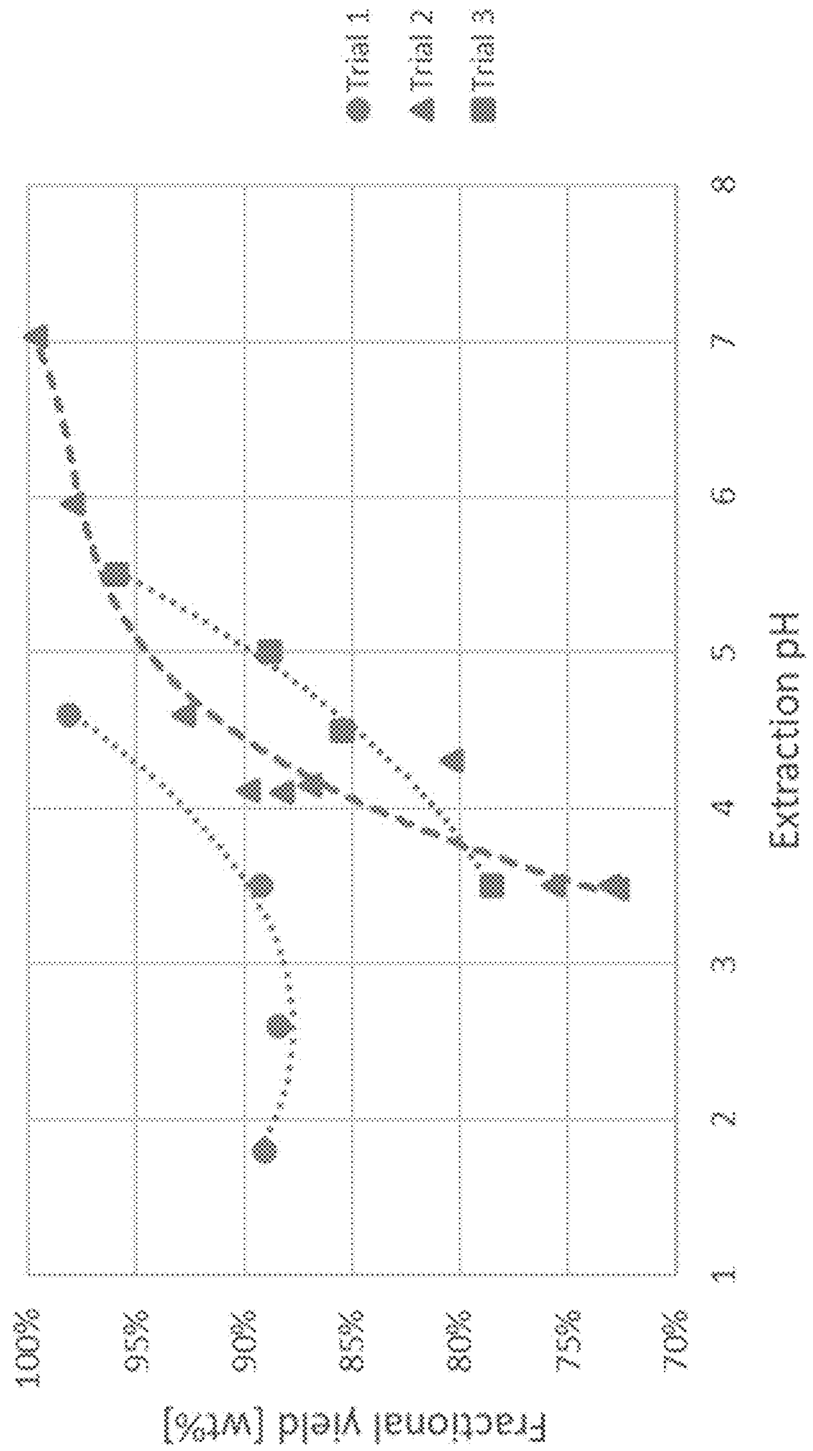
FIG. 1 presents a plot of fractional yield versus the pH during extraction for Examples 1-3 (Trials 1-3).

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the designs, compositions, or processes/methods described herein are contemplated and can be interchanged, with or without explicit description of the particular combination. Accordingly, unless explicitly recited otherwise, any aspect or feature disclosed herein can be combined to describe inventive designs, compositions, or processes/methods consistent with the present disclosure.

While compositions and processes/methods are described herein in terms of "comprising" various components or steps, the compositions and processes/methods also can "consist essentially of" or "consist of" the various components or steps, unless stated otherwise. The terms "a," "an," and "the" are intended to include plural alternatives, e.g., at least one, unless otherwise specified.

Generally, groups of elements are indicated using the numbering scheme indicated in the version of the periodic table of elements published in *Chemical and Engineering News,* 63(5), 27, 1985. In some instances, a group of elements can be indicated using a common name assigned to the group; for example, alkali metals for Group 1 elements, alkaline earth metals for Group 2 elements, and so forth.

The term "contacting" is used herein to refer to materials or components which can be blended, mixed, slurried, dissolved, reacted, treated, compounded, or otherwise contacted or combined in some other manner or by any suitable method. The materials or components can be contacted together in any order, in any manner, and for any length of time, unless otherwise specified.

The term "activating" or "activation" is used to refer to the process step of converting a water-insoluble protopectin component in a starting pectin-containing biomass composition to a water-soluble pectin form without extracting the water-soluble pectin into the liquid component.

The term "activated" is used to refer to the state of completion of the activating or activation process step, i.e., resulting in an activated mixture or activated pectin-containing biomass composition.

Although any methods and materials similar or equivalent to those described herein can be used in the practice or testing of the invention, the typical methods and materials are herein described.

All publications and patents mentioned herein are incorporated herein by reference in their entirety for the purpose of describing and disclosing, for example, the constructs and methodologies that are described in the publications and patents, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. As a representative example, the pH during activation can be in certain ranges in various aspects of this invention. By a disclosure that the pH is in a range from 0.5 to 3 during activation, the intent is to recite that the pH during activation can be any pH within the range and, for example, can be in any range or combination of ranges from 0.5 to 3, such as from 0.5 to 2.5, from 1 to 3, from 1 to 2.5, from 1 to 2, or from 1.5 to 2.5, and so forth. Likewise, all other ranges disclosed herein should be interpreted in a manner similar to this example.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

DETAILED DESCRIPTION OF THE INVENTION

Disclosed herein are methods for subjecting plant-based materials that contain pectin to sequential pectin activation and pectin extraction. An objective of this invention is transform protopectin (water-insoluble pectin) into pectin (water-soluble pectin) under conditions in which pectin depolymerization and degradation are minimized or eliminated. Herein, hot acidic aqueous alcohol conditions and mechanical energy can be used for this activation step. Subsequently, the water-soluble pectin can be extracted under mild pH and temperature conditions using water, resulting in high quality pectin at a high yield.

Most of the pectin in a starting pectin-containing biomass material is in the water-insoluble form of protopectin, which must be activated to become functional and separable. By conducting activation in a hot acidic aqueous alcohol-containing medium at or above 35 wt. % based on the total mixture, the protopectin is converted to water-soluble pectin within the structure of the peel rather than extracted and is thus less subject to acid hydrolysis. The pectin is in a water-soluble state and free to be released from the cellulose matrix, though unextracted due to the solubilization suppression from the high alcohol content. During the subsequent extraction of the pectin in an aqueous solution, both a higher extraction efficiency/yield and pectin quality are obtained from the activated pectin-containing biomass compositions, as opposed to non-activated pectin-containing biomass material, due to the protection of the pectin during the activation process.

Activated pectin-containing biomass compositions include mostly an insoluble fiber component and a water-soluble pectin component. The resulting extracted pectin from the activated pectin-containing biomass material generally has a higher intrinsic viscosity and a higher degree of esterification as compared to pectin from non-activated pectin-containing biomass material, while the insoluble residual fiber material may have improved functionality, such a higher water binding capacity.

Pectin Activation and Extraction Processes

A first process consistent with an aspect of this invention can comprise (or consist essentially of, or consist of) (a) providing an aqueous alcohol mixture containing water, at least 35 wt. % alcohol, and a starting pectin-containing biomass material comprising an insoluble fiber component and an insoluble protopectin component, (b) contacting an acid with the aqueous alcohol mixture at a temperature of at least 40° C. and a pH in a range from 0.5 to 2.5 to form an activated mixture containing a liquid component and an activated pectin-containing biomass composition comprising the insoluble fiber component and a water-soluble pectin component, (c) removing at least a portion of the liquid component from the activated mixture to form a solid fraction containing the activated pectin-containing biomass composition, and (d) contacting the solid fraction with water to form an aqueous mixture and adjusting a pH of the aqueous mixture to within a range from 3.5 to 6, thereby forming a liquid fraction containing the water-soluble pectin component. In the first process, mechanical energy is applied to the aqueous alcohol mixture of step (a), or to the activated mixture of step (b), or both.

A second process consistent with another aspect of this invention can comprise (or consist essentially of, or consist of) (i) providing an aqueous alcohol mixture containing water, at least 35 wt. % alcohol, and a starting pectin-containing biomass material comprising an insoluble fiber component and an insoluble protopectin component, (ii) contacting an acid with the aqueous alcohol mixture at a temperature of at least 40° C. and a pH in a range from 0.5 to 2.5 to form an activated mixture containing a liquid component and an activated pectin-containing biomass composition comprising the insoluble fiber component and a water-soluble pectin component, (iii) adjusting the pH of the activated mixture to at least 2.8, (iv) removing at least a portion of the liquid component from the activated mixture to form a solid fraction containing the activated pectin-containing biomass composition, (v) drying the solid fraction, and (vi) contacting the solid fraction with water to form an aqueous mixture and adjusting a pH of the aqueous mixture to within a range from 3.5 to 6, thereby forming a liquid fraction containing the water-soluble pectin component. In the second process, mechanical energy is applied to the aqueous alcohol mixture of step (i), or to the activated mixture of step (ii), or both.

A third process consistent with another aspect of this invention can comprise (or consist essentially of, or consist of) (A) providing an aqueous alcohol mixture containing water, at least 35 wt. % alcohol, and a starting pectin-containing biomass material comprising an insoluble fiber component and an insoluble protopectin component, (B) contacting an acid with the aqueous alcohol mixture at a temperature of at least 40° C. and a pH in a range from 0.5 to 2.5 to form an activated mixture containing a liquid component and an activated pectin-containing biomass composition comprising the insoluble fiber component and a water-soluble pectin component, (C) adjusting the pH of the activated mixture to within a range from 3.5 to 6, (D) removing at least a portion of the liquid component from the activated mixture to form a solid fraction containing the activated pectin-containing biomass composition, and (E) contacting the solid fraction with water to form an aqueous mixture and adjusting a pH of the aqueous mixture to within a range from 3.5 to 6, thereby forming a liquid fraction containing the water-soluble pectin component. In the third process, mechanical energy is applied to the aqueous alcohol mixture of step (A), or to the activated mixture of step (B), or both.

Generally, the features of first, second, and third processes disclosed herein (e.g., the aqueous alcohol mixture, the starting pectin-containing biomass material, the acid, the temperature and pH during activation, the mechanical energy, the solid-liquid separation in the removing step, the pH adjustment, and the pH during water extraction, among others) are independently described herein, and these features can be combined in any combination to further describe the disclosed first, second, and third processes. Moreover, other process steps can be conducted before, during, and/or after any of the steps listed in the disclosed processes, unless stated otherwise. Additionally, any water-soluble pectin compositions produced in accordance with any of the disclosed processes are within the scope of this disclosure and are encompassed herein.

Referring now to step (a) of the first process, step (i) of the second process, and step (A) of the third process, an aqueous alcohol mixture is provided which contains water, at least 35 wt. % alcohol, and a starting pectin-containing biomass material comprising an insoluble fiber component (e.g., comprising cellulosic material) and an insoluble protopectin component. As described herein, the aqueous alcohol mixture in step (a) or step (i) or step (A) contains at least 35 wt. % alcohol, and in some aspects, can contain at least 40 wt. % alcohol, or at least 50 wt. % alcohol. Representative and non-limiting ranges for the amount of alcohol in the aqueous alcohol mixture include from 35 to 95 wt. % alcohol, from 40 to 80 wt. % alcohol, or from 50 to 75 wt. % alcohol, and the like. The alcohol compound utilized in step (a) or step (i) or step (A) is not particularly limited, but often the alcohol compound comprises methanol, ethanol, n-propanol, isopropanol, butanol, or isopentanol, and the like. Mixture or combinations or two or more alcohols can be used, if desired.

Various sources can be used for the starting pectin-containing biomass material of step (a), step (i), and step (A). For example, the starting pectin-containing biomass material can be obtained from citrus fruit. In particular, the starting pectin-containing biomass material can comprise citrus fruit peels, and the citrus fruit peels can be selected from orange peels, lemon peels, lime peels, grapefruit peels, tangerine peels, and the like, as well as any combination thereof.

Prior to step (a), step (i), and step (A), the first, second, and third processes can further comprise a step of washing the starting pectin-containing biomass material (e.g., citrus fruit peels such as orange peels) in a wash solution comprising water. One washing step or more than one washing step can be used. Alternatively, and also prior to step (a), step (i), and step (A), the first, second, and third processes can further comprise a step of washing the starting pectin-containing biomass material (e.g., citrus fruit peels such as orange peels) in a wash solution comprising an alcohol. Likewise, one washing step or more than one washing step can be used. In a particular aspect of this invention, the starting pectin-containing biomass material comprises (or consists essentially of, or consists of) alcohol washed citrus fruit peels, of which alcohol washed orange peels is a specific example.

In the activation step of step (b) of the first process and step (ii) of the second process and step (B) of the third process, an acid is contacted with the aqueous alcohol mixture at a temperature of at least 40° C. and a pH in a range from 0.5 to 2.5 to form an activated mixture containing a liquid component and an activated pectin-containing biomass composition comprising the insoluble fiber component and a water-soluble pectin component. Any suitable acid can be utilized in step (b) of the first process, step (ii) of the second process, and step (B) of the third process, and illustrative and non-limiting examples include nitric acid, hydrochloric acid, phosphoric acid, oxalic acid, sulfuric acid, citric acid, malic acid, acetic acid, and the like. Mixtures or combinations of two or more acids can be utilized, if desired. In one aspect, the acid comprises (or consists essentially of, or consists of) nitric acid, while in another aspect, the acid comprises (or consists essentially of, or consists of) hydrochloric acid, and in yet another aspect, the acid comprises (or consists essentially of, or consists of) phosphoric acid.

The pH during pectin activation step (b) and step (ii) and step (B) is from 0.5 to 2.5. More often, the pH is in a range from 0.5 to 2; alternatively, from 0.5 to 1.5; alternatively, from 1 to 2.5; alternatively, from 1 to 2; or alternatively, from 1.5 to 2.5. Similar to step (a) and step (i) and step (A), the alcohol content of the activated mixture during pectin activation step (b) and step (ii) and step (B) is at least 35 wt. %, or at least 40 wt. %, or at least 50 wt. %, with representative ranges including alcohol contents of from 35 to 95 wt. %, from 40 to 80 wt. %, or from 50 to 75 wt. %, and the like.

The temperature during activation is at least 40° C. In one aspect, the temperature can fall within a range from 40 to 85° C., while in another aspect, the temperature can fall within a range from 40 to 60° C., and in yet another aspect, the temperature can fall within a range from 50 to 75° C., and in still another aspect, the temperature can fall within a range from 60 to 80° C., although not limited thereto. In these and other aspects, these temperature ranges also are meant to encompass circumstances where the pectin activation step is performed at a series of different temperatures, instead of at a single fixed temperature, falling within the respective ranges, wherein at least one temperature falls within the respective ranges. The pressure at which the activation step is conducted is not particularly limited, but can be at an elevated pressure (e.g., from 5 psig to 100 psig), at atmospheric pressure, or at any suitable sub-atmospheric pressure. In some instances, the activation is conducted at atmospheric pressure, eliminating the need for pressurized vessels and their associated cost and complexity. The activation step can be conducted (and the activated pectin-containing biomass composition comprising the insoluble fiber component and a water-soluble pectin component can be formed) over a wide range of time periods, such as from 10 min to 10 hr, from 15 min to 6 hr, from 30 min to 2 hr, or from 45 min to 90 min, but is not limited solely to these time periods. Other appropriate temperature, pressure, and time ranges are readily apparent from this disclosure.

In the first process, mechanical energy is applied to the aqueous alcohol mixture of step (a), or to the activated mixture of step (b), or both. Thus, mechanical energy is applied during step (a), step (b), or both step (a) and step (b). Likewise, in the second process, mechanical energy is applied to the aqueous alcohol mixture of step (i), or to the activated mixture of step (ii), or both. Accordingly, mechanical energy is applied during step (i), step (ii), or both step (i) and step (ii). Similarly, in the third process, mechanical energy is applied to the aqueous alcohol mixture of step (A), or to the activated mixture of step (B), or both. Accordingly, mechanical energy is applied during step (A), step (B), or both step (A) and step (B).

In one aspect, for example, the mechanical energy is applied to the aqueous alcohol mixture of step (a) and step (i) and step (A). In another aspect, the mechanical energy is applied to the activated mixture of step (b) and step (ii) and step (B). In yet another aspect, the mechanical energy is applied to the aqueous alcohol mixture of step (a) and step (i) and step (A) and to the activated mixture of step (b) and step (ii) and step (B). One objective of utilizing the mechanical energy can be to reduce the starting pectin-containing biomass material to its fibrous structure. Another objective of utilizing mechanical energy as described herein can be to convert a greater amount of water-insoluble protopectin into water-soluble pectin.

The amount of mechanical energy applied in the first process, the second process, and the third process can depend upon many variables, such as which step or steps mechanical energy is applied, the amount of the starting pectin-containing biomass material in the respective mixture, the pH of the activated mixture, and the temperature of the activating step, among others. Nonetheless, the mechanical energy often is at least 800 kJ, at least 1200 kJ, or at least 1900 kJ, per kg of dry matter of the starting pectin-containing biomass material. Thus, representative ranges include from 800 kJ/kg (or 1,200 kJ/kg, or 1,400 kJ/kg, or 1,900 kJ/kg) to 7,800 kJ/kg, or from 800 kJ/kg (or 1,200 kJ/kg, or 1,400 kJ/kg, or 1,900 kJ/kg) to 14,400 kJ/kg. Stated another way, the mechanical energy can be at least 36 kJ, at least 40 kJ, or at least 60 kJ, per kg of the respective mixture, and this can range up to 150 kJ, 200 kJ, 400 kJ, or 600 kJ per kg of the respective mixture.

Any suitable device or apparatus can be used for applying the mechanical energy. For example, a pump, a plate refiner, a disc refiner, an extruder, a lobe pump, a centrifugal pump, a shear pump, a homogenizer, and the like, or any combination thereof, can be used for applying the mechanical energy.

Referring now to step (iii) of the second process, the pH of the activated mixture is adjusted (increased) to at least 2.8, and in step (C) of the third process, the pH of the activated mixture is adjusted to within a range from 3.5 to 6. Illustrative ranges for the pH in step (iii) include from 2.8 to 9 or from 2.8 to 5. However, in most instances, the pH is increased in step (iii) to within a range from 2.8 to 4. Illustrative ranges for the pH in step (C) include, for example, from 3.5 to 5, from 4 to 5.5, from 4 to 5, from 4.5 to 6, or from 4.5 to 5.5.

Ordinarily, but not always required, the pH in step (iii) or step (C) is adjusted (increased) by adding any suitable basic material to the activated mixture. The basic material is not particularly limited, but sodium hydroxide, potassium hydroxide, sodium carbonate, potassium carbonate, ammonia, ammonium hydroxide, and the like, as well combinations thereof, often are used as the basic material to adjust the pH in step (iii) or step (C). The amount and type of the basic material, as well as the incoming pH of the activated mixture, can determine the resulting pH in step (iii) or step (C).

An alternative to the use of a basic material, adjusting the pH in step (iii) or step (C) can comprise adding a quantity of water sufficient to increase the pH of the activated mixture to at least 2.8 for step (iii) or to within a range from 3.5 to 6 for step (C). The amount and type (source) of the water, as well as the incoming pH of the activated mixture, can determine the resulting pH in step (iii) or step (C).

In step (c) of the first process and step (iv) of the second process and step (D) of the third process, at least a portion of the liquid component is removed from the activated mixture to form a solid fraction containing the activated pectin-containing biomass composition. The solid fraction containing the activated pectin-containing biomass composition often is referred to as a wet cake. The removing step can utilize any suitable solid-liquid separation technique(s). While not limited thereto, the removing step can employ draining, decanting, pressing, centrifuging, filtering, sedimenting, stripping (e.g., steam stripping), evaporating, drying, and the like, as well as any combination thereof. Moreover, any of these techniques can be performed once or more than once in the removing step, as needed.

After step (c) and step (iv) and step (D), and depending greatly on the liquid-solid separations technique that is employed, the solid fraction can have a solids content of from 15 to 85 wt. % in one aspect, from 25 to 85 wt. % in another aspect, from 30 to 80 wt. % in yet another aspect, and from 40 to 70 wt. % in still another aspect. Optionally, this solid fraction can be washed (once or more than once) with any suitable alcohol solution containing at least 35 wt. % alcohol, such as a solution containing water and from 40 to 80 wt. % alcohol.

During step (c) and step (iv) and step (D), and beneficially, substantially none (less than or equal to 3 wt. %) of the water-soluble pectin component is removed. Thus, pectin yield in the overall first and second processes is increased. In further aspects, less than or equal to 1 wt. %, or less than or equal to 0.5 wt. %, of the water-soluble pectin component is removed in step (c) and step (iv) and step (D).

Referring now to step (v) of the second process, the solid fraction is dried, generally to a solids content of at least 85 wt. %, and more often, at least 88 wt. %, at least 90 wt. %, or at least 92 wt. % solids. Any suitable drying conditions can be used, such as drying temperatures ranging from 50° C. to 200° C., or from 100° C. to 150° C., and the drying can be conducted at atmospheric pressure or any suitable sub-atmospheric pressure, e.g., less than 150 Torr, or less than 50 Torr.

In the extraction step of step (d) and step (vi) and step (E), the solid fraction is contacted with water to form an aqueous mixture and the pH of the aqueous mixture is adjusted to within a range from 3.5 to 6, thereby forming a liquid fraction containing the water-soluble pectin component. Ordinarily, but not always required, the pH of the aqueous mixture is adjusted to within a range from 3.5 to 6 by adding any suitable basic material to the solid fraction and water. The amount and type of the basic material, as well as the incoming pH of the solid fraction, can determine the resulting pH in step (d) and step (iv) and step (E). The aqueous mixture can be stirred or agitated in step (d) and step (vi) and step (E).

An alternative to the use of a basic material, adjusting the pH in step (d) or step (vi) or step (E) can comprise contacting the solid fraction with a quantity of water sufficient to form the aqueous mixture with the pH within a range from 3.5 to 6. The amount and type (source) of the water, as well as the incoming pH of the solid fraction, can determine the resulting pH in step (d) or step (vi) or step (E).

The pH during pectin extraction step (d) and step (vi) and step (E) is adjusted to within a range from 3.5 to 6. In some aspects, the pH is in a range from 3.5 to 5; alternatively, from 4 to 5.5; alternatively, from 4 to 5; alternatively, from 4.5 to 6; or alternatively, from 4.5 to 5.5. Unlike step (a) and step (i) and step (A), the alcohol content of the aqueous mixture during extraction is generally minimized, and typically the aqueous mixture contains less than or equal to 25 wt. % of alcohol. More often, the aqueous mixture contains less than or equal to 15 wt. %, less than or equal to 10 wt. %, less than or equal to 5 wt. %, or less than or equal to 1 wt. %, of alcohol. In some aspects, the alcohol content is limited to no more than 10 wt. % or no more than 5 wt. %.

The temperature during extraction is not particularly limited. In one aspect, the temperature can fall within a range from 20 to 80° C., while in another aspect, the temperature can fall within a range from 20 to 60° C., and in yet another aspect, the temperature can fall within a range from 30 to 55° C., and in still another aspect, the temperature can fall within a range from 50 to 75° C. In these and other aspects, these temperature ranges also are meant to encompass circumstances where the pectin extraction step is performed at a series of different temperatures, instead of at a single fixed temperature, falling within the respective ranges, wherein at least one temperature falls within the respective ranges. The pressure at which the extraction step is conducted is not particularly limited, but can be at an elevated pressure (e.g., from 5 psig to 100 psig), at atmospheric pressure, or at any suitable sub-atmospheric pressure. In some instances, the extraction is conducted at atmospheric pressure, eliminating the need for pressurized vessels and their associated cost and complexity. The extraction step can be conducted (and the liquid fraction containing the water-soluble pectin component can be formed) over a wide range of time periods, such as from 10 min to 10 hr, from 15 min to 6 hr, from 30 min to 2 hr, or from 45 min to 90 min, but is not limited solely to these time periods. Other appropriate temperature, pressure, and time ranges are readily apparent from this disclosure.

Optionally, the first process, the second process, and the third process can further comprise a step of isolating the water-soluble pectin component from the liquid fraction (e.g., by precipitating or other suitable technique), and/or drying the water-soluble pectin component, and/or milling the water-soluble pectin component. In some aspects, the water-soluble pectin component is isolated from the liquid fraction, dried, and milled.

If desired, the first process, the second process, and the third process can further comprise a step of contacting the solid fraction after step (d) or step (vi) or step (E) with a second aqueous mixture having a pH in a range from 0.5 to 2.5, from 1 to 2.5, from 1.5 to 2.5, or from 1 to 2, to form a second liquid fraction containing additional water-soluble pectin component. The second aqueous mixture can contain any suitable acid, for example, any acid suitable for use in the activation step. Additionally or alternatively, the first process, the second process, and the third process can further comprise a step of washing the solid fraction after step (d) or step (vi) or step (E) with water to form a washed liquid fraction containing additional water-soluble pectin component. Subsequently, there can be a further a step of isolating the additional water-soluble pectin component from the liquid fraction (e.g., by precipitating or other suitable technique), and/or a step of drying the additional water-soluble pectin component, and/or a step of milling the additional water-soluble pectin component. Similar to above, in some aspects, the additional water-soluble pectin component is isolated from the respective liquid fraction, dried, and milled.

The first, second, and third processes result in an unexpectedly high yield of pectin. Generally, the yield of the water-soluble pectin component, based on dry matter of the starting pectin-containing biomass material, can range from 30 to 55 wt. %. In one aspect, the yield ranges from 30 to 50 wt. %, from 35 to 55 wt. % in another aspect, from 35 to 50 wt. % in another aspect, from 40 to 55 wt. % in yet another aspect, and from 40 to 50 wt. % in still another aspect. In addition, for the second process, the yield of the water-soluble pectin component, based on the dry solid fraction after step (v), can range from 60 to 99 wt. %, and more often, from 70 to 99 wt. %, from 70 to 95 wt. %, from 80 to 99 wt. %, or from 80 to 95 wt. %.

The first, second, and third processes also can be characterized by an unexpectedly high extraction efficiency. Generally, the extraction efficiency of the respective process is at least 30%, and more often, the extraction efficiency of the respective process can be at least 32%, at least 34%, or at least 36%.

As discussed herein, the pectin produced herein is of high quality, as quantified by the intrinsic viscosity (IV) and the degree of esterification (DE). While not limited thereto, the water-soluble pectin component often has an IV of at least 5 dL/g, and more often an IV of at least 6, at least 7, or at least 8 dL/g. Additionally or alternatively, the water-soluble pectin component often has a DE of at least 65%, and more often, a DE of at least 68%, at least 70%, or at least 72%.

EXAMPLES

The invention is further illustrated by the following examples, which are not to be construed in any way as imposing limitations to the scope of this invention. Various other aspects, modifications, and equivalents thereof which, after reading the description herein, may suggest themselves to one of ordinary skill in the art without departing from the spirit of the present invention or the scope of the appended claims.

The degree of esterification (DE) and degree of galacturonic acid (GA) were measured using a modification of the method set forth in FAO JECFA Monographs 4 (2007). First, 100 mL of an acid alcohol (100 mL 50-60% isopropanol+5 mL HCl fuming 37%) were added to 2.00 g of ground peel/pectin while stirring with a magnetic stirrer for 10 min. The mixture was filtered or passed through a Buchner funnel with filter paper and the beaker was rinsed with 6×15 mL of the acid alcohol and filtered or passed through the Buchner funnel with filter paper. The filtrate was then washed first with approximately 1000 mL of 50-60% isopropanol and thereafter with approximately 2×50 mL of 100% isopropanol. The sample then was dried for approximately 2.5 hr at 105° C.

Samples weighing approximately 0.40 g were measured for duplicate determination (deviation between duplicate determinations must not exceed 1.5% absolute, otherwise the test was repeated). The samples were first moistened with approximately 2 mL of 100% isopropanol. Approximately 50 mL carbon dioxide-free water then was added to the moistened samples while stirring with a magnetic stirrer. The samples were then evaluated by titration, either by means of an indicator or by using a pH meter/auto burette.

For titration using an indicator, 5 drops of phenolphthalein indicator were added to the sample and it was titrated with 0.1 N NaOH until a change of color was observed (record it as $V_1$ titer). Then, 20.0 mL of 0.5 N NaOH was added while stirring and covered with foil for exactly 15 min, and then 20.0 mL of 0.5 N HCl was added while stirring until the color disappeared. Three drops of phenolphthalein indicator then were added followed by titrating with 0.1 N NaOH until a change of color was observed (record it as $V_2$ titer). To compensate for possible inaccuracies of balancing the two portions of 20 mL of 0.5 N NaOH and HCl respectively, a so-called "blind measurement" was performed (i.e., 100 mL of deionized water was treated in the same way as the sample solution, including the titrations). The last titration result was then recorded as $B_1$ titer. The degree of esterification and degree of galacturonic acid were then determined from the following calculations (N is the corrected normality for 0.1 N NaOH used for titration):

$$V_t = V_1 + (V_2 - B_1)$$

$$\% \ DE = \left[(V_2 - B_1)/V_t\right] * 100$$

$$\% \ GA = \frac{[194.1 * V_t * N * 100]}{\text{weight of washed and dried sample (mg)}}$$

For intrinsic viscosity and pectin content, an approximate 40 mg sample was weighed and dispersed in 100 μL of ethanol, then 40 mL of effluent was added, and the mixture was stirred using a magnetic stirrer in a 75+/−2° C. block heater for 30 minutes. Effluent preparation for 10-L effluent for FIPA (Safety: 0.3 M Lithium acetate buffer) was as follows:

1. Pour approx. 3 L Milli-Q water into a 5000-mL graduated beaker.
2. Add a magnetic stir bar and place on a magnetic stirrer to produce a suitable vortex during all additions.
3. Weigh 125.6 g lithium hydroxide monohydrate into a weighing boat and transfer quantitatively to the graduated beaker.
4. Weigh 0.20 g sodium azide into a weighing boat and transfer quantitatively to the graduated beaker.
5. Weigh 360.4 g glacial acetic acid into a 500-mL beaker and transfer quantitatively to the graduated beaker.
6. When all three chemicals are dissolved, add Milli-Q water to 5000 mL and maintain stirring for 5 min.
7. Pour the contents into the pressure container.
8. Rinse the graduated beaker with a total volume of 5000 mL Milli-Q water that is transferred to the pressure container, thus producing a total of 10 L effluent.
9. The liquid is filtered using a Pressure filtration unit with Sartopore 2 filter from Sartorius (0.45+/−0.2 um).
10. After preparation, check pH of the buffer, which must be 4.6+/−0.1.

The sample was transferred to a 5° C. water bath for 5 min to cool to room temperature and since the sample contains non-soluble material, it must be manually dissolved and filtrated (0.45 um filter) prior to being transferred to an auto sampler vial. The intrinsic viscosity of the sample was then determined using size exclusion chromatography (SEC). The molecules were separated according to their size by gel permeation chromatography with the effluent from the chromatography column passing four detectors (Refractive Index Detector, Right Angle Laser Light Scattering Detector, Low Angle Laser Light Scattering Detector, and a Viscosity Detector). Viscotek software converted the detector signals from the viscosity detector and refractive index detector to intrinsic viscosity.

A Viscotek TDA 302 FIPA instrument mounted with Viscotek pump VE 1122 Solvent delivery system was used along with Thermo Separation Products Auto sampler AS 3000 with a sample preparation module. Columns included Thermo BioBasis SEC60 (150×7.8 mm) that were connected to a computer with OmniSEC software for data collection and calculations. The run time at the auto sampler was set at 10 min and a 25 µL full loop injection was used. The Viscotek TDS 302 FIPA instrument also automatically measured the concentration of soluble pectin in the sample, thus providing data for determination of the percent recovery of pectin.

Examples 1-3

Figure 2:
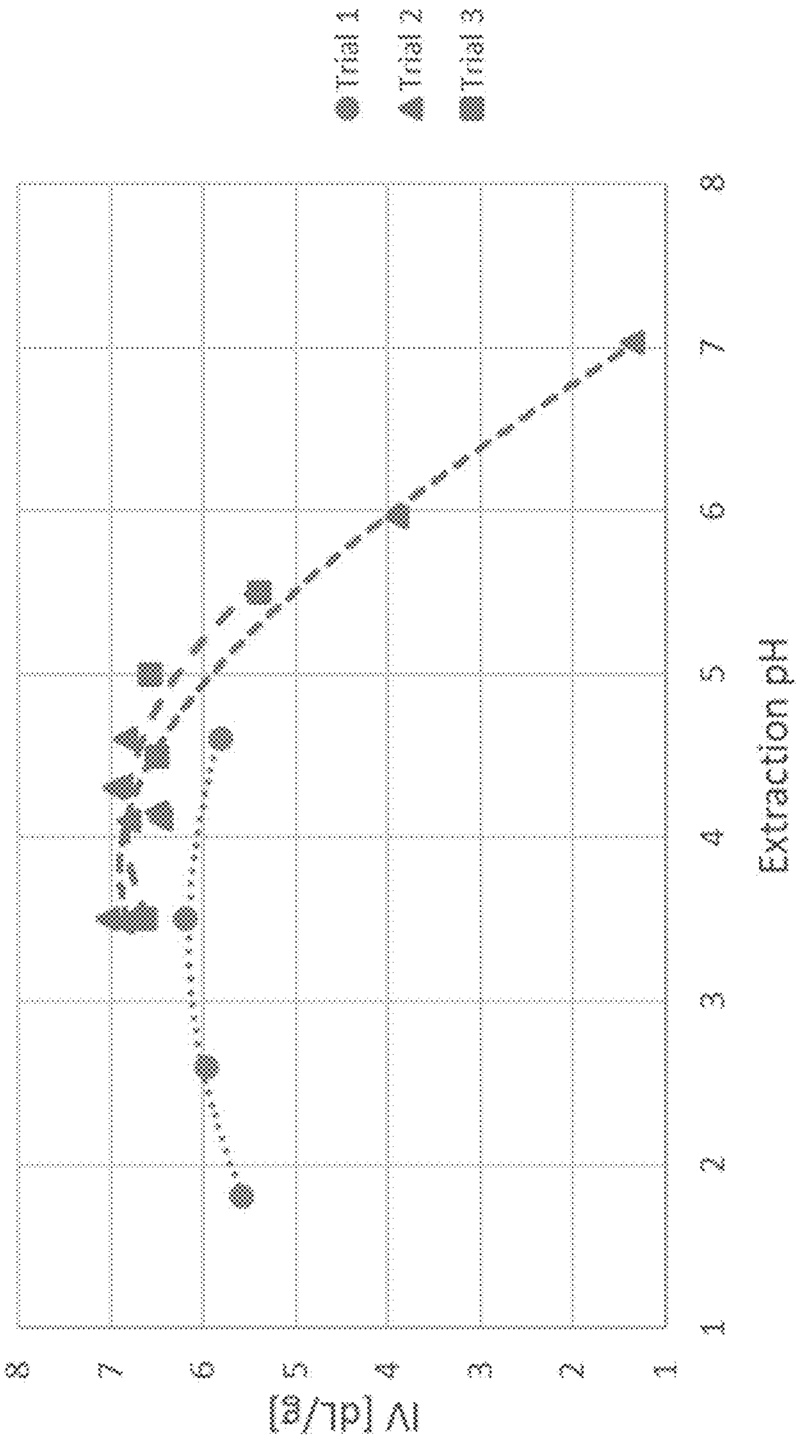
FIG. 2 presents a plot of intrinsic viscosity versus the pH during extraction for Examples 1-3 (Trials 1-3).

In Example 1 (Trial 1), 500 g of activated pectin-containing biomass material (originating from oranges) were mixed with 36 L cation exchanged water (Na-base). The slurry was extracted for 5 hr in total at various pH values in the range of 1.8 to 4.6. The slurry was vacuum filtrated through a perlite coating and filter cloth, followed by ion exchange. The solution was precipitated in 80% isopropanol and drained/pressed. The cake was washed in 60% isopropanol, followed by a drain/press, and then it was dried. A fractional yield was calculated on basis of the raw material measurement, which indicates the potential pectin yield. As shown in FIG. 1, there was no yield difference in the pH range of 1.8-3.5, although there was a significant increase in yield at pH 4.6. FIG. 2 demonstrates that the IV was largely constant over the pH range, although very acidic conditions reduced the IV.

In Example 2 (Trial 2), 250 g of activated pectin-containing biomass material (originating from oranges) were mixed with 12 L cation exchanged water (Na-base). The slurry was extracted for 1.5 hr in total at various pH values in the range of 3.5 to 7.0. The slurry was vacuum filtrated through a perlite coating and filter cloth, followed by ion exchange. The solution was precipitated in 80% isopropanol and drained/pressed. The cake was washed in 60% isopropanol, followed by a drain/press, and then it was dried. A fractional yield was calculated on basis of the raw material measurement, which indicates the potential pectin yield. At this shorter extraction time, there was a clear increase in yield as the pH was increased, as shown in FIG. 1. The IV in FIG. 2 was generally constant until a pH of 6 and above, where there was excessive beta-elimination.

In Example 3 (Trial 3), 475 g of activated pectin-containing biomass material (originating from oranges) were mixed with 18 L cation exchanged water (Na-base). The slurry was extracted for 1 hr in total at various pH values in the range of 3.5 to 6.0. The slurry was vacuum filtrated through a perlite coating and filter cloth, followed by ion exchange. The solution was precipitated in 80% isopropanol and drained/pressed. The cake was washed in 60% isopropanol, followed by a drain/press, and then it was dried. A fractional yield was calculated on basis of the raw material measurement, which indicates the potential pectin yield. Similar to Example 2, FIG. 1 shows an increase in pH resulted in higher yield for Example 3. At pH 5.5 and above, however, the beta-elimination was excessive and the IV decreased in FIG. 2, so the pH should be below 5.5 in order to maximize the IV of the pectin.

Example 4

In Example 4, 300 g of conventional non-activated pectin-containing biomass material (originating from oranges) were mixed with 12 L cation exchanged water (Na-base). The slurry was extracted for 1.5 hr at a pH of 5.2. The slurry was vacuum filtrated through a perlite coating and filter cloth, followed by ion exchange. The solution was precipitated in 80% isopropanol and drained/pressed. The cake was washed in 60% isopropanol, followed by a drain/press, and then it was dried. A fractional yield was calculated on basis of a traditional extraction, which indicates the potential pectin yield. For Example 4, it was only possible to recover 13% of the potential yield, since the starting material was not activated.

Example 5

In Example 5, wet oranges were used as a starting material to produce both activated and non-activated dry citrus peel from the same raw material for pectin extraction.

Preparation of non-activated citrus peel. With a dry matter content of 25 wt. %, 8.5 kg orange peel was taken directly from a juicer. The peel was mixed with 13.9 kg of 96% ethanol and 10.8 L cation exchanged water (Na-base). The peel was agitated for 20 min at 42° C. The slurry was drained and the residual solid fraction was pressed. The cake material was mixed with 11 kg of 96% ethanol and 5.2 L cation exchanged water (Na-base). The peel was with agitated for 20 min at 70° C. The slurry was drained and the residual solid fraction was pressed. The slurry was drained and the residual solid fraction was pressed. The cake material was mixed with 11.3 kg of 96% ethanol and 3.9 L cation exchanged water (Na-base). The peel was agitated for 20 min at 70° C. Because clean ethanol has a relatively high pH, the pH of the slurry was adjusted to 4 with nitric acid, to avoid any excessive degradation during the drying. The slurry was drained and the residual solid fraction was pressed. The cake material was dried in a tray oven.

Extraction of non-activated citrus peel. 450 g of the dried non-activated citrus peel was added to 18 L of cation exchanged water (Na-base), then 69 mL of 62% nitric acid added to the slurry. The mixture was heated to 70° C. for 7 hr at a pH of 1.4. The resulting slurry was vacuum filtered with a filter cloth. The resulting solid fraction was re-extracted in a subsequent extraction by adding 7 L of cation exchanged water (Na-base) to the cake. Then, 80 mL of 10% nitric acid was added to a pH of 1.6 and the slurry was contacted at 70° C. for 2 hr. The slurry was filtered at a pressure filter coated with perlite. The residual solid fraction was discarded. Both the liquid from the first extraction and second extraction were adjusted to a pH below 3.0 with 10% nitric acid. They were individually precipitated with 80% isopropanol in a 1:3 (solution:isopropanol) volumetric ratio. The cake was drained and pressed, then it was washed in 60% isopropanol in a 1:3 (original solution:isopropanol) volumetric ratio. The pectin was dried in a tray heating cabinet.

Preparation of activated citrus peel. With a dry matter of 25 wt. %, 8.5 kg orange peel was taken directly from the juicer. The peel was mixed with 13.9 kg of 96% ethanol, 10.8 L cation exchanged water (Na-base), and 30 mL 62% nitric acid. The peel was transferred through a recirculating pump, which provided mechanical energy. The peel was recirculated for 30 min at 50° C. The slurry was drained and the residual solid fraction was pressed. The cake material was mixed with 11 kg of 96% ethanol and 5.2 L cation exchanged water (Na-base), then 175 mL of 62% nitric acid was added to a pH of 1.4. The peel was agitated for 100 min at 70° C. The slurry was drained and the residual solid fraction was pressed. The cake material was mixed with 11.3 kg of 96% ethanol and 3.9 L cation exchanged water (Na-base), then 190 mL of 10% KOH was added to a pH of 3.5. The peel was agitated for 40 min at ambient temperature. The slurry was drained and the residual solid fraction was pressed. The cake material was dried in a tray oven.

Extraction of activated citrus peel. 290 g of the dried activated citrus peel was added to 18 L of cation exchanged water (Na-base), then 58 mL of 10% $Na_2CO_3$ was added to the slurry. The mixture was heated to 70° C. for 90 min at a pH of 4.8. The resulting slurry was vacuum filtered with a filter cloth. The resulting solid fraction was re-extracted in a subsequent extraction in which 7 L of cation exchanged water (Na-base) was added to the cake, then 138 mL of 10% nitric acid to a pH of 1.6, and the slurry was extracted at 70° C. for 2 hr. The slurry was filtered at a pressure filter coated with perlite. The residual solid fraction was discarded. Both the liquid from the first extraction and second extraction were adjusted to a pH below 3.0 with 10% nitric acid. They were individually precipitated with 80% isopropanol in a 1:3 (solution:isopropanol) volumetric ratio. The cake was drained and pressed, then it was washed in 60% isopropanol in a 1:3 (original solution:isopropanol) volumetric ratio. The pectin was dried in a tray heating cabinet.

The non-activated citrus peel extraction had a yield of 5.2%, while the activated citrus peel had a yield of 5.0%. The yield was calculated as total pectin amount relative to the initial wet peel amount. Of the non-activated citrus peel, the first extraction had an IV of 3.5 dL/g, while the second extraction had an IV of 3.1 dL/g. For the activated citrus peel, the first extraction had an IV of 6.0 dL/g, while the second extraction had an IV of 4.8 dL/g. Thus, it is possible to produce approximately the same amount of pectin with the activated citrus peel relative to the non-activated citrus peel, but it can be done with a much milder extraction, which produces a much higher IV in the resulting pectin material.

Example 6

In Example 6, oranges were juiced and the peel was collected. Dry matter content was 20.3 wt. %. The peel was washed in 63% isopropanol for 5 min, then it was drained and pressed.

One part of the pressed peel was mixed with 60% isopropanol, pH was adjusted to 1.7, and the mixture heated to 70° C. for 60 min while agitating. After 60 min, the mixture was cooled to 15° C. and drained and washed in 60% isopropanol. Finally, it was drained and washed in 80% isopropanol, and the pH was adjusted to 3.5-4.0 (e.g., with sodium carbonate). The peel was drained and pressed and dried in a heating cabinet at 65° C. to a final dry matter content of 90% (Example 6A). Another part of the pressed peel was washed in 80% isopropanol, pH was adjusted to 3.5-4.0, and the peel was drained and pressed and dried in a heating cabinet at 65° C. to a final dry matter of 90% (Example 6B).

10 grams of Example 6B were extracted in 600 g of deionized water at room temperature for 60 min while stirring. Then, it was drained in a cloth, and the liquid was precipitated in 80% isopropanol. The precipitated fiber was drained and dried (Example 6C).

10 grams of Example 6A were extracted in 600 g of deionized water at room temperature for 60 min while stirring. Then, it was drained in a cloth, and the liquid was precipitated in 80% isopropanol. The precipitated fiber was drained and dried (Example 6D).

10 grams of Example 6B were extracted in 600 grams of deionized water and nitric acid at 70° C. for 60 min while stirring. Then, it was drained in a cloth, and the liquid was precipitated in 80% isopropanol. The precipitated fiber was drained and dried (Example 6E).

10 grams of Example 6A were extracted in 600 grams of deionized water at 70° C. for 60 min while stirring. Then, it was drained in a cloth, and the liquid was precipitated in 80% isopropanol. The precipitated fiber was drained and dried (Example 6F).

100 grams of Example 6A were extracted in 8 L of cold deionized water at pH 6.7 at room temperature for 60 min while stirring. Then, it was drained in a cloth, and the liquid was precipitated in 80% isopropanol. The precipitated fiber was drained and dried (Example 6G).

100 grams of Example 6A were extracted in 8 L of cold deionized water at pH 4.5 (with addition of nitric acid) at room temperature for 60 min while stirring. Then, it was drained in a cloth, and the liquid was precipitated in 80% isopropanol. The precipitated fiber was drained and dried (Example 6H).

Table I summarizes Examples 6C-6G and the intrinsic viscosity (IV), degree of esterification (DE), content of galacturonic acid (GA), and extracted pectin (yield). The galacturonic acid content depends on the purity of the recovered pectin, and is related to efficiency of purification. The standard yield in Table I is calculated to adjust to 85% GA, for comparison at an equivalent GA content.

As shown in Table I, when the peel was activated (the peel of Example 6A), pectin can be readily extracted at a mild pH above pH 4 in a high yield exceeding 30 wt. % at ambient as well as elevated temperatures. The reference peel had insignificant yield at mild pH extraction conditions.

Example 7

Figure 3:
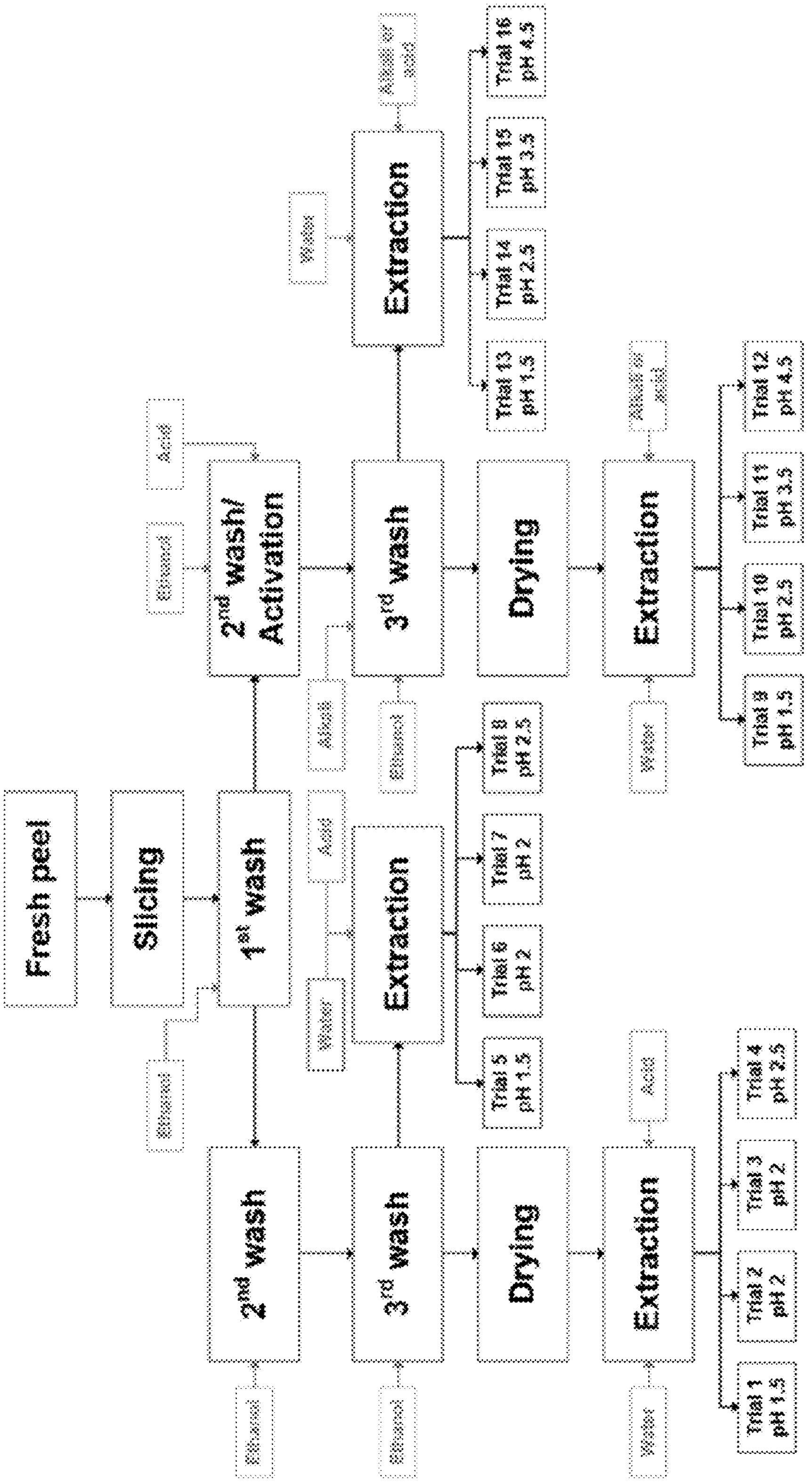
FIG. 3 presents a schematic flow diagram of the process used to produce Trials 1-16 of Example 7.

FIG. 3 and Table II summarize Trials 1-16 of Example 7. First, 200 kg of fresh orange peel was sliced using a knife mill. The first washing of the sliced peel was performed at 4.5 wt. % solids (dry matter) in an aqueous alcohol mixture containing 45 wt. % ethanol at 25° C. for 60 min while agitating with a lobe pump. The washed peel was separated by decanting and pressing, and if the peel was not activated (non-activated peel), the washed peel was subjected to a second wash step, which was performed in substantially the same manner as the first wash step, except that the ethanol content was 55 wt. %.

For activated peel, the washed peel from the first wash, after decanting and pressing, was activated at 4.5 wt. % solids (dry matter) in an aqueous alcohol mixture containing 55 wt. % ethanol, adjusted to pH 1.35 with nitric acid (53% w/w), at 70° C. for 60 min while agitating with a lobe pump. The activated peel was separated by decanting and pressing (to ~25-45 wt. % dry matter), and washed at 4.5 wt. % solids in an aqueous alcohol mixture containing 75 wt. % ethanol, adjusted to pH 3.5 with KOH (50% w/w), at 25° C. for 30 min while agitating with a lobe pump. The non-activated peel was subjected to the same pH adjusted wash (3rd wash)

as the activated peel. Both the activated peel and non-activated peel then were separated by decanting and pressing after this washing step.

Pectin extraction was conducted by mixing the respective peel with water at 67° C. for 1 hr at the pH values shown in FIG. 3 and Table II. Drying was conducted in a vacuum dryer, and pH adjustments were made using nitric acid or KOH, as needed. The extraction efficiency (%) in Table II was calculated via the following equation:

Extraction efficiency (%)={[Yield (g/L)×water (L)]/(peel (kg)×(1−moisture)}/10.

Referring first to the peel after drying (Trials 1-4 and 9-12), for dry non-activated peel, Table II demonstrates that the maximum extraction efficiency was 29.4% in the pH range of 1.5 to 2. In the same range, activated peel surprisingly reached 32.1% extraction efficiency. In addition, for activated peel extracted at pH 4.5, the extraction efficiency reached 34.8%. As disclosed herein, a suitable pH range for extracting pectin from activated peel was 4.2 to 5 (e.g., pH of 4.5-4.6). For non-activated peel, the extraction efficiency dropped significantly when the pH was higher than 2.2 (see Trial 4 at pH 2.5). These results demonstrate that activated peel provides higher extraction yield or efficiency when compared with non-activated peel, even at higher pHs, and particularly when the pH range was from 4-5 during pectin extraction. Table II also shown that an extraction pH of 4.5 provides higher yield and efficiency than pH 3.5 for dry activated peel.

Table II also summarizes the intrinsic viscosity (IV) data for activated and non-activated peel. The IV of activated peel extracted at pH 1.5 was equal to the IV of non-activated peel, which is likely the result of pectin degradation caused by the low pH. However, the IV of activated peel extracted at pH>2.5 was much higher than the IV of non-activated peel. Beneficially, the pectin that is water-extracted from activated peel at milder pH values is of higher quality, due in part to the previous transformation of protopectin into water-soluble pectin under high alcohol conditions (alcohol helps preserve higher IV). Conversely, the low pH conditions (pH<2.5) for non-activated peel during water extraction causes IV losses, particular for pH less than 2 (e.g., Trial 1). In addition, extraction of non-activated peel at a pH higher than 2 provides very low yield (e.g., Trial 4).

Referring now to the wet peel without drying (Trials 5-8 and 13-16), and similar to the dry peel, Table II demonstrates that for the same extraction pH, the pectin extraction efficiency was higher for activated peel (except for Trial 5 at pH 1.5) than for non-activated peel. In addition, while for non-activated peel the efficiency was inversely proportional to the pH, for activated peel, the efficiency was directly proportional to the pH, demonstrating that mild pH extraction conditions were advantageous for pectin extraction of activated peel. At the best conditions, activated peel was able to obtain 36.8% efficiency with an IV of 7.7 dL/g, while non-activated peel only reached 33.3% efficiency with an IV of 7.2 dL/g. The IVs of activated peel extracted in pH 3.5 and 4.5 were higher than the IVs of non-activated peel (note that the IV of Trial 14 is considered an outlier).

In sum, Table II demonstrates that activated peel (whether wet or dried) advantageously resulted in both higher pectin yield and higher pectin quality when compared with non-activated peel, extracted at the same conditions. For activated peel, pectin quality and yield were directly proportional to the pH, while for non-activated peel, yield was inversely proportional to the pH. Therefore, only activated peel (whether wet or dried) can combine the benefits of higher pectin quality and higher yield at mild extraction pH conditions, such as a pH range of 4-5.

Example 8

In Example 8, the impact of pectin concentration (dilution in water) and the source of water on the pH was investigated. Unexpectedly, as summarized in Table III, the pH varied significantly based on both the pectin concentration and the water source. Often, pectin is extracted from peel at relatively high initial concentrations (~13 g/L pectin), but may be diluted to approximately 7 g/L at the end of a pectin extraction process. A very dilute concentration of 1 g/L also for used for comparison. The source of the peel for these tests was an activated peel, and after activation, the pH was increased with a base prior to drying the peel.

In Table III, the pilot cation exchanged water (cold) was retrieved from a production plant. It was heated with direct steam input in a pilot facility to make the pilot cation exchanged water (hot). The other water sources were laboratory double ion exchanged water and conventional tap water.

At a typical high pectin concentration of 13 g/L, none of the water sources resulted in a pH above 4, but pH levels of 3.8 were achieved. Thus, if pH values above 4 for pectin extraction are needed at a high pectin concentration, a basic material may be required. However, at moderate pectin concentrations of ~7 g/L, pH values of 4.4 were achieved with only water dilution, depending upon the water source. And, more surprisingly, a pH of 7-8 was reached for very dilute pectin concentrations.

While not wishing to be bound by theory, it is believed that the more ions (especially divalent) present in the water source, the more it will exchange with the pectin and drive down the pH. Further, the amount of dissolved carbon dioxide in the water source can impact the pH (e.g., it effectively acts as an acid), and direct steam input can affect the amount present. Thus, removing dissolved carbon dioxide increases the pH of the water source.

TABLE I

| Example | Peel | Extraction pH | Temperature ° C. | IV dL/g | DE % | GA % | Yield Wt. % | Standard Yield Wt. % |
|---|---|---|---|---|---|---|---|---|
| 6C | 6B | 6.8 | 25 | — | — | — | 2.2 | 2.2 |
| 6D | 6A | 4.9 | 25 | 8.4 | 72.4 | 74.2 | 49.4 | 43.1 |
| 6E | 6B | 1.9 | 70 | 7.6 | 74.4 | 77.1 | 21.1 | 19.1 |
| 6F | 6A | 4.3 | 70 | 7.6 | 72.2 | 81.2 | 46.6 | 44.5 |
| 6G | 6A | 6.7 | 25 | 6.6 | 67.9 | 88.9 | 30.8 | 32.2 |
| 6H | 6A | 4.5 | 25 | 7.7 | 73.8 | 86.9 | 37.5 | 38.3 |

TABLE II

| | Loading | | Extraction | | | Juice | Pectin | | |
|---|---|---|---|---|---|---|---|---|---|
| | | | | | | | | | Extraction |
| Sample description | Peel (Kg) | Water (L) | Time (hr) | Temp (° C.) | pH | Visc. (cP) | Yield (g/L) | IV (dL/g) | efficiency (%) |
| Fresh peel extraction | 8 | 31.6 | 2.0 | 67 | 1.92 | 15.5 | 5.6 | 6.3 | 17.0 |
| Fresh peel extraction | 8 | 31.6 | 2.0 | 67 | 1.9 | 16.5 | 5.3 | 6.3 | 16.1 |
| Non activated peel - Trial 1 - pH 1.5 | 0.3 | 9 | 1.0 | 67 | 1.46 | 45 | 8.7 | 4.8 | 26.1 |
| Non activated peel - Trial 2 - pH 2.0 | 0.3 | 9 | 1.0 | 67 | 1.93 | 75 | 9.4 | 6.9 | 28.2 |
| Non activated peel - Trial 3 - pH 2.0 | 0.3 | 9 | 1.0 | 67 | 1.87 | 70 | 9.8 | 6.5 | 29.4 |
| Non activated peel - Trial 4 - pH 2.5 | 0.3 | 9 | 1.0 | 67 | 2.52 | 25 | 5.5 | 6.6 | 16.5 |
| Non activated peel - Trial 5 - pH 1.5 | 2.7 | 25.2 | 1.0 | 67 | 1.54 | 115 | 10.7 | 7.2 | 33.3 |
| Non activated peel - Trial 6 - pH 2.0 | 2.7 | 25.2 | 1.0 | 67 | 2.01 | 100 | 9.6 | 7.1 | 29.9 |
| Non activated peel - Trial 7 - pH 2.0 | 2.7 | 25.2 | 1.0 | 67 | 2.07 | 130 | 8.7 | 7.0 | 27.1 |
| Non activated peel - Trial 8 - pH 2.5 | 2.7 | 25.2 | 1.0 | 67 | 2.35 | 27 | 6.7 | 7.1 | 20.8 |
| Activated peel - Trial 9 - pH 1.5 | 0.3 | 9 | 1.0 | 67 | 1.45 | 97.5 | 10.7 | 6.6 | 32.1 |
| Activated peel - Trial 10 - pH 2.5 | 0.3 | 9 | 1.0 | 67 | 2.47 | 150.0 | 10.6 | 7.2 | 31.8 |
| Activated peel - Trial 11 - pH 3.5 | 0.3 | 9 | 1.0 | 67 | 3.20 | 105.0 | 10.4 | 7.3 | 31.2 |
| Activated peel - Trial 12 - pH 4.5 | 0.3 | 9 | 1.0 | 67 | 3.51 | 132.5 | 11.6 | 7.2 | 34.8 |
| Activated peel - Trial 13 - pH 1.5 | 1.7 | 16.9 | 1.0 | 67 | 1.49 | 125 | 10.0 | 7.2 | 33.1 |
| Activated peel - Trial 14 - pH 2.5 | 1.7 | 16.9 | 1.0 | 67 | 2.2 | 357.5 | 10.1 | 5.4 | 33.5 |
| Activated peel - Trial 15 - pH 3.5 | 1.7 | 16.9 | 1.0 | 67 | 2.46 | 270 | 10.5 | 7.6 | 34.8 |
| Activated peel - Trial 16 - pH 4.5 | 1.7 | 16.9 | 1.0 | 67 | 4.3 | — | 11.1 | 7.7 | 36.8 |

TABLE III

| Pectin concentration g/L | Pilot cation exchanged (hot) | Pilot cation exchanged (cold) | Lab double ion exchanged | Tap water |
|---|---|---|---|---|
| | Measured pH values | | | |
| 1 | 4.2 | 7.6 | 4.1 | 7.7 |
| 7 | 3.6 | 4.4 | 3.5 | 4.4 |
| 13 | 3.4 | 3.8 | 3.4 | 3.8 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A process comprising (a) providing an aqueous alcohol mixture containing water, at least 35 wt. % alcohol, and a starting pectin-containing biomass material comprising an insoluble fiber component and an insoluble protopectin component, (b) contacting an acid with the aqueous alcohol mixture at a temperature of at least 40° C. and a pH in a range from 0.5 to 2.5 to form an activated mixture containing a liquid component and an activated pectin-containing biomass composition comprising the insoluble fiber component and a water-soluble pectin component, (c) removing at least a portion of the liquid component from the activated mixture to form a solid fraction containing the activated pectin-containing biomass composition, and (d) contacting the solid fraction with water to form an aqueous mixture and adjusting a pH of the aqueous mixture to within a range from 3.5 to 6, thereby forming a liquid fraction containing the water-soluble pectin component, wherein mechanical energy is applied to the aqueous alcohol mixture of step (a), or to the activated mixture of step (b), or both.

Aspect 2. A process comprising (i) providing an aqueous alcohol mixture containing water, at least 35 wt. % alcohol, and a starting pectin-containing biomass material comprising an insoluble fiber component and an insoluble protopectin component, (ii) contacting an acid with the aqueous alcohol mixture at a temperature of at least 40° C. and a pH in a range from 0.5 to 2.5 to form an activated mixture containing a liquid component and an activated pectin-containing biomass composition comprising the insoluble fiber component and a water-soluble pectin component, (iii) adjusting the pH of the activated mixture to at least 2.8, (iv) removing at least a portion of the liquid component from the activated mixture to form a solid fraction containing the activated pectin-containing biomass composition, (v) drying the solid fraction, and (vi) contacting the solid fraction with water to form an aqueous mixture and adjusting a pH of the aqueous mixture to within a range from 3.5 to 6, thereby forming a liquid fraction containing the water-soluble pectin component, wherein mechanical energy is applied to the aqueous alcohol mixture of step (i), or to the activated mixture of step (ii), or both.

Aspect 2. A process comprising (A) providing an aqueous alcohol mixture containing water, at least 35 wt. % alcohol, and a starting pectin-containing biomass material comprising an insoluble fiber component and an insoluble protopectin component, (B) contacting an acid with the aqueous alcohol mixture at a temperature of at least 40° C. and a pH in a range from 0.5 to 2.5 to form an activated mixture containing a liquid component and an activated pectin-containing biomass composition comprising the insoluble fiber component and a water-soluble pectin component, (C) adjusting the pH of the activated mixture to within a range from 3.5 to 6, (D) removing at least a portion of the liquid component from the activated mixture to form a solid fraction containing the activated pectin-containing biomass composition, and (E) contacting the solid fraction with water to form an aqueous mixture and adjusting a pH of the aqueous mixture to within a range from 3.5 to 6, thereby forming a liquid fraction containing the water-soluble pectin component, wherein mechanical energy is applied to the aqueous alcohol mixture of step (A), or to the activated mixture of step (B), or both.

Aspect 4. The process of any one of aspects 1-3, wherein the aqueous alcohol mixture in step (a) or step (i) or step (A) contains at least 40 wt. %, at least 50 wt. %, from 35 to 95 wt. %, from 40 to 80 wt. %, or from 50 to 75 wt. % alcohol.

Aspect 5. The process of any one of aspects 1-4, wherein the alcohol comprises methanol, ethanol, n-propanol, isopropanol, butanol, isopentanol, or any combination thereof.

Aspect 6. The process of any one of aspects 1-5, wherein the insoluble fiber component comprises cellulosic material.

Aspect 7. The process of any one of aspects 1-6, further comprising a step of washing the starting pectin-containing biomass material in a wash solution comprising water prior to step (a) or step (i) or step (A).

Aspect 8. The process of any one of aspects 1-6, further comprising a step of washing the starting pectin-containing biomass material in a wash solution comprising an alcohol prior to step (a) or step (i) or step (A).

Aspect 9. The process of any one of aspects 1-8, wherein the starting pectin-containing biomass material is obtained from citrus fruit.

Aspect 10. The process of any one of aspects 1-9, wherein the starting pectin-containing biomass material comprises citrus fruit peels selected from orange peels, lemon peels, lime peels, grapefruit peels, tangerine peels, or any combination thereof.

Aspect 11. The process of any one of aspects 1-10, wherein the starting pectin-containing biomass material comprises alcohol washed citrus fruit peels.

Aspect 12. The process of any one of aspects 1-11, wherein the pH in step (b) or step (ii) or step (B) is from 0.5 to 2, from 0.5 to 1.5, from 1 to 2.5, from 1 to 2, or from 1.5 to 2.5.

Aspect 13. The process of any one of aspects 1-12, wherein the temperature is from 40 to 85° C., from 40 to 60° C., from 50 to 75° C., or from 60 to 80° C.

Aspect 14. The process of any one of aspects 1-13, wherein the activated mixture in step (b) or step (ii) or step (B) contains at least 35 wt. %, at least 40 wt. %, at least 50 wt. %, from 35 to 95 wt. %, from 40 to 80 wt. %, or from 50 to 75 wt. % alcohol.

Aspect 15. The process of any one of aspects 1-14, wherein the acid comprises nitric acid, hydrochloric acid, phosphoric acid, oxalic acid, sulfuric acid, citric acid, malic acid, acetic acid, or any combination thereof.

Aspect 16. The process of any one of aspects 1-15, wherein step (b) or step (ii) or step (B) is conducted for from 10 min to 10 hr, from 15 min to 6 hr, from 30 min to 2 hr, or from 45 min to 90 min.

Aspect 17. The process of any one of aspects 1-16, wherein from 20 wt. % to 55 wt. %, or from 20 wt. % to 45 wt. %, of the activated pectin-containing biomass composition is the water-soluble pectin component.

Aspect 18. The process of any one of aspects 1-17, wherein the activated pectin-containing biomass composition has a coil overlap parameter of from 1.2 to 4.5, from 2 to 4.5, or from 2.5 to 4.5.

Aspect 19. The process of any one of aspects 1-18, wherein the mechanical energy is applied to the aqueous alcohol mixture of step (a) or step (i) or step (A).

Aspect 20. The process of any one of aspects 1-19, wherein the mechanical energy is applied to the activated mixture of step (b) or step (ii) or step (B).

Aspect 21. The process of any one of aspects 1-20, wherein applying the mechanical energy further comprises reducing the starting pectin-containing biomass material to its fibrous structure.

Aspect 22. The process of any one of aspects 1-21, wherein a pump, a plate refiner, a disc refiner, an extruder, a lobe pump, a centrifugal pump, a shear pump, a homogenizer, or any combination thereof, is used for applying the mechanical energy.

Aspect 23. The process of any one of aspects 1-22, wherein the mechanical energy is at least 800 kJ, at least 1200 kJ, or at least 1900 kJ, per kg of dry matter of the starting pectin-containing biomass material.

Aspect 24. The process of any one of aspects 1-23, wherein the mechanical energy is at least 36 kJ, at least 40 kJ, or at least 60 kJ, per kg of the mixture.

Aspect 25. The process of any one of aspects 2-24, wherein adjusting the pH in step (iii) or step (C) comprises adding a basic material to the activated mixture.

Aspect 26. The process of aspect 25, wherein the basic material comprises sodium hydroxide, potassium hydroxide, sodium carbonate, potassium carbonate, ammonia, ammonium hydroxide, or any combination thereof.

Aspect 27. The process of any one of aspects 2-24, wherein adjusting the pH in step (iii) or step (C) comprises adding a quantity of water sufficient to increase the pH of the activated mixture to at least 2.8 for step (iii) or to within a range from 3.5 to 6 for step (C).

Aspect 28. The process of any one of aspects 2-27, wherein the pH is increased in step (iii) to within a range from 2.8 to 9, from 2.8 to 5, or from 2.8 to 4.

Aspect 29. The process of any one of aspects 1-28, wherein the removing step comprises any suitable technique, e.g., draining, decanting, pressing, centrifuging, filtering, sedimenting, stripping, evaporating, drying, or any combination thereof, performed once or more than once.

Aspect 30. The process of any one of aspects 1-29, wherein the solid fraction has a solids content of from 15 to 85 wt. %, from 25 to 85 wt. %, from 30 to 80 wt. %, or from 40 to 70 wt. %, after step (c) or step (iv) or step (D).

Aspect 31. The process of any one of aspects 1-30, wherein substantially none (e.g., less than or equal to 3 wt. %, less than or equal to 1 wt. %, or less than or equal to 0.5 wt. %) of the water-soluble pectin component is removed in step (c) or step (iv) or step (D).

Aspect 32. The process of any one of aspects 1-31, further comprising a step of washing the solid fraction with an alcohol solution containing at least 35 wt. % alcohol.

Aspect 33. The process of any one of aspects 2-32, wherein the solid fraction has a solids content of at least 85 wt. %, at least 88 wt. %, at least 90 wt. %, or at least 92 wt. %, after step (v).

Aspect 34. The process of any one of aspects 1-33, wherein the aqueous mixture contains less than or equal to 25 wt. %, less than or equal to 15 wt. %, less than or equal to 10 wt. %, less than or equal to 5 wt. %, or less than or equal to 1 wt. %, of alcohol.

Aspect 35. The process of any one of aspects 1-34, wherein the aqueous mixture is stirred or agitated.

Aspect 36. The process of any one of aspects 1-35, wherein adjusting the pH in step (d) or step (vi) or step (E) comprises contacting the solid fraction with water and a basic material to form the aqueous mixture with the pH within a range from 3.5 to 6.

Aspect 37. The process of aspect 36, wherein the basic material comprises sodium hydroxide, potassium hydroxide, sodium carbonate, potassium carbonate, ammonia, ammonium hydroxide, or any combination thereof.

Aspect 38. The process of any one of aspects 1-35, wherein adjusting the pH in step (d) or step (vi) or step (E) comprises contacting the solid fraction with a quantity of water sufficient to form the aqueous mixture with the pH within a range from 3.5 to 6.

Aspect 39. The process of any one of aspects 1-38, wherein the pH in step (d) or step (vi) or step (E) is adjusted to within a range from 3.5 to 5, from 4 to 5.5, from 4 to 5, from 4.5 to 6, or from 4.5 to 5.5.

Aspect 40. The process of any one of aspects 1-39, wherein step (d) or step (vi) or step (E) is conducted at a temperature from 20 to 80° C., from 20 to 60° C., from 30 to 55° C., or from 50 to 75° C.

Aspect 41. The process of any one of aspects 1-40, wherein step (d) or step (vi) or step (E) is conducted for from 10 min to 10 hr, from 15 min to 6 hr, from 30 min to 2 hr, or from 45 min to 90 min.

Aspect 42. The process of any one of aspects 1-41, further comprising a step of isolating the water-soluble pectin component from the liquid fraction (e.g., precipitating), and/or drying the water-soluble pectin component, and/or milling the water-soluble pectin component.

Aspect 43. The process of any one of aspects 1-42, further comprising a step of contacting the solid fraction after step (d) or step (vi) or step (E) with a second aqueous mixture having a pH in a range from 0.5 to 2.5, from 1 to 2.5, from 1.5 to 2.5, or from 1 to 2, to form a second liquid fraction containing additional water-soluble pectin component.

Aspect 44. The process of any one of aspects 1-43, further comprising a step of washing the solid fraction after step (d) or step (vi) or step (E) with water to form a washed liquid fraction containing additional water-soluble pectin component.

Aspect 45. The process of aspect 43 or 44, further comprising a step of isolating the additional water-soluble pectin component from the liquid fraction (e.g., precipitating), and/or drying the additional water-soluble pectin component, and/or milling the additional water-soluble pectin component.

Aspect 46. The process of any one of aspects 1-45, wherein a yield of the water-soluble pectin component, based on the dry starting pectin-containing biomass material, is from 30 to 55 wt. %, from 30 to 50 wt. %, from 35 to 55 wt. %, from 35 to 50 wt. %, from 40 to 55 wt. %, or from 40 to 50 wt. %.

Aspect 47. The process of any one of aspects 1-46, wherein the water-soluble pectin component has an IV of at least 5, at least 6, at least 7, or at least 8 dL/g.

Aspect 48. The process of any one of aspects 1-47, wherein the water-soluble pectin component has a DE of at least 65%, at least 68%, at least 70%, or at least 72%.

Aspect 49. The process of any one of aspects 1-48, wherein the process is characterized by an extraction efficiency of at least 30%, at least 32%, at least 34%, or at least 36%.

Aspect 50. A water-soluble pectin composition prepared by the process of any one of the preceding aspects.

We claim:

1. A process comprising:

(a) providing an aqueous alcohol mixture containing water, at least 35 wt. % alcohol, and a starting pectin-containing biomass material comprising an insoluble fiber component and an insoluble protopectin component;

(b) contacting an acid with the aqueous alcohol mixture at a temperature of at least 40° C. and a pH in a range from 0.5 to 2.5 to form an activated mixture containing a liquid component and an activated pectin-containing biomass composition comprising the insoluble fiber component and a water-soluble pectin component;

(c) removing at least a portion of the liquid component from the activated mixture to form a solid fraction containing the activated pectin-containing biomass composition;

(d) contacting the solid fraction with water to form an aqueous mixture, wherein the aqueous mixture contains less than or equal to 10 wt. % of alcohol, and adjusting a pH of the aqueous mixture to within a range from 4 to 5, thereby forming a liquid fraction containing the water-soluble pectin component; and (e) isolating the water-soluble pectin component from the liquid fraction;

wherein mechanical energy is applied to the aqueous alcohol mixture of step (a), or to the activated mixture of step (b), or both.

2. The process of claim 1, further comprising the steps of: adjusting the pH of the activated mixture of step (b) to 2.8 to 5; and drying the solid fraction of step (c).

3. The process of claim 1, further comprising the step of adjusting the pH of the activated mixture of step (b) to within a range from 3.5 to 6.

4. The process of claim 1, wherein the starting pectin-containing biomass material is obtained from citrus fruit.

5. The process of claim 1, wherein from 20 wt. % to 55 wt. % of the activated pectin-containing biomass composition is the water-soluble pectin component.

6. The process of claim 2, wherein adjusting the pH of the activated mixture of step (b) comprises adding a basic material to the activated mixture, wherein the basic material comprises sodium hydroxide, potassium hydroxide, sodium carbonate, potassium carbonate, ammonia, ammonium hydroxide, or any combination thereof.

7. The process of claim 3, wherein adjusting the pH of the activated mixture of step (b) comprises adding a basic material to the activated mixture, wherein the basic material comprises sodium hydroxide, potassium hydroxide, sodium carbonate, potassium carbonate, ammonia, ammonium hydroxide, or any combination thereof.

8. The process of claim 1, wherein the solid fraction has a solids content of from 15 to 85 wt. % after step (c).

9. The process of claim 1, wherein substantially none of the water-soluble pectin component is removed in step (c).

10. The process of claim 1, wherein adjusting the pH in step (d) comprises contacting the solid fraction with water and a basic material to form the aqueous mixture, wherein the basic material comprises sodium hydroxide, potassium hydroxide, sodium carbonate, potassium carbonate, ammonia, ammonium hydroxide, or any combination thereof.

11. The process of claim 1, further comprising a step of drying the water-soluble pectin component, and/or milling the water-soluble pectin component.

12. The process of claim 1, further comprising a step of contacting the solid fraction after step (d) with a second aqueous mixture having a pH in a range from 1 to 2.5 to form a second liquid fraction containing additional water-soluble pectin component.

13. The process of claim 1, further comprising a step of washing the solid fraction after step (d) with water to form a washed liquid fraction containing additional water-soluble pectin component.

14. The process of claim 12, further comprising a step of isolating the additional water-soluble pectin component from the second liquid fraction, and/or drying the additional water-soluble pectin component, and/or milling the additional water-soluble pectin component.

15. The process of claim 13, further comprising a step of isolating the additional water-soluble pectin component from the washed liquid fraction, and/or drying the additional water-soluble pectin component, and/or milling the additional water-soluble pectin component.

16. The process of claim 1, wherein the process is characterized by an extraction efficiency of at least 30%.

17. The process of claim 1, wherein the process is characterized by an extraction efficiency of at least 34%.

* * * * *